United States Patent

[11] 3,575,533

| [72] | Inventor | Thomas J. Bubula |
| | | Joliet, Ill. |
| [21] | Appl. No. | 808,904 |
| [22] | Filed | Mar. 20, 1969 |
| [45] | Patented | Apr. 20, 1971 |
| [73] | Assignee | Caterpillar Tractor Co. |
| | | Peoria, Ill. |

[54] LIQUID LEVEL SENSING DEVICE
4 Claims, 1 Drawing Fig.

| [52] | U.S. Cl............................................... | 417/182.5, |
| | | 417/77, 137/386, 137/395 |
| [51] | Int. Cl............................................... | F16k 21/18 |
| [50] | Field of Search............................ | 137/386, |
| | 389, 391, 394, 393, 395, ; 251/62, 63; 103/25; |
| | | 417/182.5, 77, 211.5 |

[56] References Cited
UNITED STATES PATENTS

| 2,654,221 | 10/1953 | Rued............................ | 137/386X |
| 3,020,924 | 2/1962 | Davies......................... | 137/386 |
| 3,168,105 | 2/1965 | Cisco et al. .................. | 137/386 |
| 3,269,404 | 8/1966 | LeBow......................... | 137/386X |
| 3,335,746 | 8/1967 | LeBow......................... | 137/389 |

*Primary Examiner*—M. Cary Nelson
*Assistant Examiner*—David R. Matthews
*Attorney*—Fryer, Tjensvold, Feix, Phillips & Lempio ABSTRACT: A liquid level sensing device wherein, when the liquid level drops below a predetermined amount, fluid at high velocity exerts a force against one end of a valve spool, causing movement of the spool against a biasing force. When the liquid level rises above the predetermined amount, the high velocity fluid is dissipated within the liquid by friction.

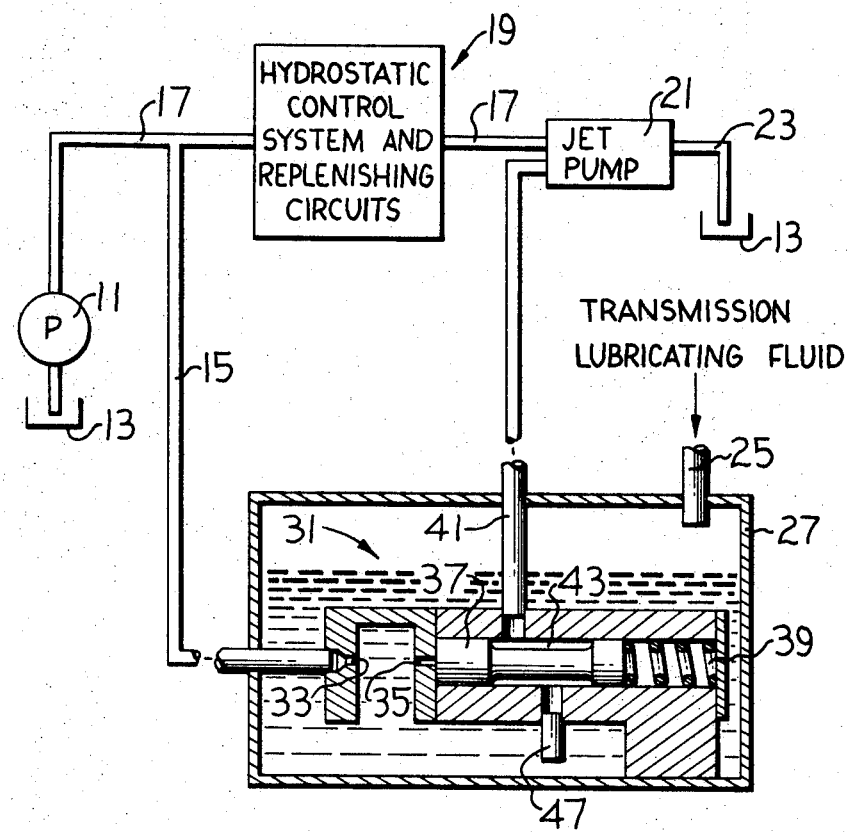

3,575,533

LIQUID LEVEL SENSING DEVICE

BACKGROUND AND SUMMARY OF THE INVENTION

This invention generally relates to a liquid level sensing device which may be utilized in a variety of applications. For purposes of illustration however, the invention is herein disclosed in the environment of a transmission case which is scavenged by a jet pump. The device will produce a signal, causing the closure of the inlet passage to the jet pump so that the pump does not draw air when the level of lubricating oil in the transmission case drops below a predetermined amount.

Jet pumps are commonly used to scavenge lubricating oil which has been delivered to transmissions or gearbox cases, so that the oil may be returned to the lubricating system. In many cases, the jet pump scavenges oil from the transmission case faster than it can be delivered to the case by the lubricating system. When nearly all of the oil has been scavenged from the case, the jet pump will draw air through the suction line, causing aeration of the lubricating oil.

In some systems, wherein a large reservoir is provided for the storage of the lubricating oil, any air which is scavenged by the jet pump can be allowed to settle out. In many systems however, space restrictions require that the volume of lubricating oil be rather small and, as a consequence, aeration of the fluid can cause erratic operation of some of the control valves and other components in the system.

In order to overcome the problem of aeration of the lubricating oil, the present invention provides a means of blocking the suction line of the jet pump when the level of liquid in the compartment to be scavenged is low enough to allow the suction line to draw air into the lubricating oil system.

Although mechanical means such as float-type actuators might be used to accomplish this purpose, the subject design has only one moving part, requiring minimum expense to manufacture and maintain and obviating any danger of the mechanism becoming inoperative. Further, the device of the present invention requires less space for mounting than the known mechanical devices.

It is therefore an object of this invention to provide an improved liquid level sensing device.

It is also an object of this invention to provide a liquid level sensing device which, when used in such a system, prevents aeration of lubricating oil which is scavenged by a jet pump.

It is a further object hereof to provide a liquid level sensing device in which a fluid jet is dissipated within the liquid when it is above a predetermined amount, but which positively acts to seal a liquid scavenging outlet when the fluid level drops below the predetermined amount.

Other objects and advantages of the present invention will become apparent from the following description and claims as illustrated in the accompanying drawing which, by way of illustration, shows a preferred embodiment of the present invention and principles thereof and what is now considered to be the best mode contemplated for applying these principles. It is recognized that other embodiments of the invention utilizing the same or equivalent principles may be used, and structural changes may be made as desired by those skilled in the art, without departing from the present invention and purview of the appended claims.

BRIEF DESCRIPTION OF THE DRAWING

The drawing is a partly schematic, partly sectional illustration of the liquid level sensing device of the present invention as utilized within a lubrication system.

DETAILED DESCRIPTION

Referring now to the drawing in greater detail, there is shown a pump 11 which draws fluid from a reservoir 13 and delivers it for distribution to lines 15 and 17. The fluid in line 17 is delivered to a hydrostatic control system and to replenishing circuits as generally illustrated at 19, such systems and circuits being well-known in the art.

Fluid in line 17 is also delivered to a jet pump 21 which is of standard construction and, upon leaving the pump through a line 23, it is returned to the reservoir 13.

Fluid in line 17, or from some other source, is also delivered, through a line 25, to a transmission or gearbox case 27 for lubrication of the parts within the case. The oil in lines 15, 17 and 25 will be referred to as fluid and the oil within case 27 will be referred to as liquid.

The fluid in line 15 is also delivered to the case 27, entering a valve 31 by means of an orifice 33 which causes the fluid to be released from the line 15 as a jet stream.

When the liquid level is at or above the orifice 33, as illustrated in the drawing, the jet stream is dissipated within the liquid by friction. However, when the liquid level drops below the orifice 33, the jet stream will enter a second orifice 35 and impinge against the end of a valve spool 37, shown abutting the orifice. This pressure on the valve spool causes the spool to move against the biasing force of a spring 39 so that a line 41, through which liquid is scavenged from the case 27 by the jet pump, is closed by a land on the spool. The blocking of line 41 thereby precludes the jet pump 21 from drawing air from the case 27.

Spool 37 will remain in the blocking position as long as the liquid level in the case remains below the orifices 33 and 35. Once the amount of lubricating oil entering through line 25 reaches the level of the orifices, however, the fluid jet will again be dissipated in the liquid and the force from spring 39 will restore spool 37 to the position shown in the drawing. The jet pump may then scavenge liquid from the case through line 41, compartment 43 in valve 31, and line 47. Thus, the liquid within the case cannot drop below the level of the orifices 33 and 35, to any great extent, but that level may be predetermined by suitable placement of the orifices relative to the vertical dimension of the case.

Thus the Applicant has illustrated and described a liquid level sensing device which constitutes a true advance in the art since it produces results, as described above, not obtainable with previously known devices. Many alterations and modifications within the purview of the following claims will be apparent to those skilled in the art.

I claim:

1. In a liquid scavenging system, means providing liquid to an apparatus, means providing fluid to a jet pump, means providing fluid to a valve within the apparatus, means connecting the valve to the jet pump for passage of liquid from the apparatus to the jet pump, spool means in said valve, means on one end of the spool means biasing said spool means to open the connecting means in the valve for converting the fluid provided thereto into a jet spray, said means for converting the fluid being so positioned as to direct the jet spray onto the other end of said spool, means in the valve allowing dissipation of the jet spray before it can impinge upon the spool means when the liquid in the apparatus exceeds a predetermined level, whereby said spool means is actuated to a position closing the connecting means until the liquid level in the apparatus rises to a point where it dissipates the jet stream whereupon the biasing means actuates the spool means to open the connecting means.

2. The scavenging system of claim 1 wherein the means in the valve for converting the fluid into a jet spray comprises a pair of axially aligned orifices.

3. The scavenging system of claim 2 wherein the means allowing dissipation of the jet spray comprise a space between the orifices into which liquid can enter.

4. The scavenging system of claim 3 wherein the axial alignment of the orifices is substantially horizontal.